C. ARMSTRONG.
WEED CUTTING ATTACHMENT FOR CULTIVATORS.
APPLICATION FILED NOV. 4, 1912.
1,092,002.
Patented Mar. 31, 1914.
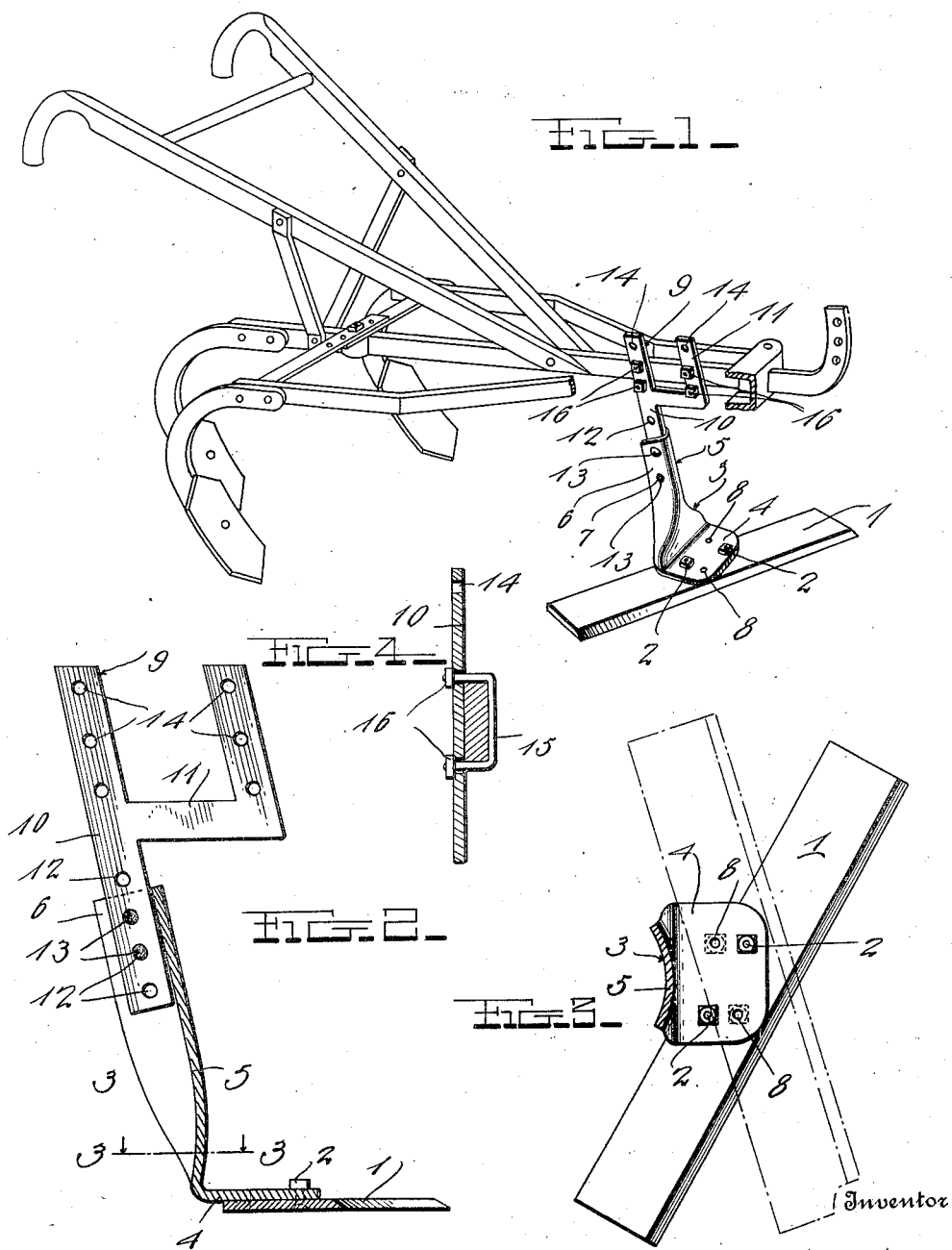
Witnesses
J. R. Pierce
C. C. Hunt
Inventor
Charles Armstrong

UNITED STATES PATENT OFFICE.

CHARLES ARMSTRONG, OF LEWIS, IOWA, ASSIGNOR OF ONE-HALF TO WILLIAM B. DAVIS, OF LEWIS, IOWA.

WEED-CUTTING ATTACHMENT FOR CULTIVATORS.

1,092,002.　　Specification of Letters Patent.　　Patented Mar. 31, 1914.

Application filed November 4, 1912. Serial No. 729,359.

*To all whom it may concern:*

Be it known that I, CHARLES ARMSTRONG, a citizen of the United States, residing at Lewis, in the county of Cass and State of Iowa, have invented certain new and useful Improvements in Weed-Cutting Attachments for Cultivators; and I do declare the following to be a full, clear, and exact description of the invention, such as will enable others skilled in the art to which it appertains to make and use the same.

This invention relates to improvements in weed cutting attachments for cultivators and the like.

One object of the invention is to provide a weed cutting attachment adapted to be applied to the beam or other suitable part of a cultivator ahead of or in rear of the plow whereby weeds between the rows of plants may be cut and destroyed simultaneously with the cultivation of the plants in the rows.

Another object is to provide a weed cutting attachment which will be simple, strong, durable and inexpensive in construction, efficient and reliable in operation and which may be adjusted vertically or horizontally to any desired angle.

With these and other objects in view, the invention consists of certain novel features of construction, and the combination and arrangement of parts as will be more fully described and claimed.

In the accompanying drawings: Figure 1 is an outline perspective view of a portion of a cultivator showing the application of the invention to one of the beams thereof; Fig. 2 is an enlarged vertical sectional view of the attachment; Fig. 3 is a horizontal sectional view taken on the line 3—3 of Fig. 2; Fig. 4 is a vertical sectional view through the beam of the cultivator and the upper portion of the attachment.

By reference to the accompanying drawing it will be seen that my improved weed cutting attachment comprises a horizontally disposed blade 1 which is preferably in the form of a flat oblong shaped plate having its forward edge beveled or sharpened. In the blade 1 midway between its ends are formed bolt holes with which are adapted to be engaged blade attaching bolts 2 whereby the blade is adjustably bolted to a supporting foot 3 comprising a horizontally disposed blade engaging plate or foot 4 and a frame engaging shank 5 which is formed from an upwardly projecting plate bent or folded upon itself longitudinally to form parallel frame engaging wings 6 having therein a plurality of alined bolt holes 7. In the blade engaging plate 4 are also formed pairs of bolt holes 8 which are arranged at different positions in the plate 4 or in parallel alinement with one another and are adapted to receive the pair of bolts 2 whereby the blade 1 may be fastened to the plate 4 at different angles as clearly indicated in full and dotted lines in Fig. 3 of the drawings.

The shank 5 of the blade supporting shoe is adjustably secured to an attaching frame 9 which is substantially in the shape of a figure 4 or comprises a main bar 10 on the forward edge of which is formed a substantially right angular extension 11. In the lower portion of the bar 10 are formed a series of bolt holes 12 with which the bolt holes 7 in the wings 6 of the shank 5 are adapted to be brought into register when the shank 5 is engaged with said lower end of the bar 10 and through the registering bolt holes 7 and 12 in the wings 6 and lower end of the bar 10 are engaged bolts 13 whereby said shoe and the blade attached thereto are adjusted vertically on the frame 9. The lower end of the shank 5 is curved inwardly from the outwardly projecting plate 4 whereby the earth together with the weeds or other growth attached thereto is properly directed rearwardly after passing over the cutting plate 1 in either position of the latter.

In the upper portion of the bar 10 and in the corresponding upwardly projecting portion of the extension 11 are formed series of bolt holes 14 with which are adapted to be engaged U-shaped clamping bolts 15, said bolts also being engaged with or embracing the beam of the cultivator. With the threaded ends of the bolts 15 are engaged clamping nuts 16 which when screwed up into engagement with the outer sides of the upper portion of the frame 9 securely clamp the latter to the beam. By thus attaching the frame 9 to the beam it will be seen that by engaging the ends of the bolts 15 with different bolt holes in the upper end of the bar 10 and extension 11 that the frame 9 may be secured to the beam at different angles or inclinations and will thereby support the cutting blade 1 at different angles or positions. It will also be seen that by adjustably attaching the shoe 3 to the frame 9 in the manner described that the blade 1 may be regulated to cut the weeds above the ground or at any desired depth below the ground.

While the attachment is shown in the present instance as being applied to the beam of a cultivator in advance of the cultivating blades it is obvious that the attachment may be applied to any other suitable part and in any other desired position on the cultivator. By providing my improved weed cutting attachment it will be seen that the weeds between the rows of plants will be cut and destroyed simultaneously with the cultivation of the plants.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

The combination with a cultivator beam, of a weed cutting attachment comprising a frame adapted to be attached to said beam, said frame consisting of a main bar and a substantially right angular shaped extension located along the length of the bar and projecting outwardly from one edge thereof, a shank embracing the lower extension of said bar and adjustable thereon, an outwardly projecting foot forming the lower end of the shank and provided with a plurality of openings in parallel relation to one another, a blade having a pair of openings therethrough on a line with the length of the blade, the lower embracing end of the shank being rearwardly curved oppositely toward the lower portion of the foot with which the blade is angularly engaged, and a pair of bolts adapted to be passed through the openings in the blade and the foot whereby the blade is adapted to be secured in reversed angles.

In testimony whereof I have hereunto set my hand in presence of two subscribing witnesses.

CHARLES ARMSTRONG.

Witnesses:
W. B. DAVIS,
R. K. OKELL.